(12) United States Patent
Sato et al.

(10) Patent No.: US 12,230,765 B2
(45) Date of Patent: Feb. 18, 2025

(54) METHOD OF PRODUCING LAMINATE FOR SECONDARY BATTERY

(71) Applicant: ZEON CORPORATION, Tokyo (JP)

(72) Inventors: Masanobu Sato, Tokyo (JP); Masuhiro Oonishi, Tokyo (JP); Hiroshi Koga, Tokyo (JP); Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 933 days.

(21) Appl. No.: 16/975,392

(22) PCT Filed: Feb. 1, 2019

(86) PCT No.: PCT/JP2019/003729
§ 371 (c)(1),
(2) Date: Aug. 25, 2020

(87) PCT Pub. No.: WO2019/163489
PCT Pub. Date: Aug. 29, 2019

(65) Prior Publication Data
US 2021/0036375 A1 Feb. 4, 2021

(30) Foreign Application Priority Data
Feb. 26, 2018 (JP) ................................. 2018-032347

(51) Int. Cl.
*H01M 10/0585* (2010.01)
*H01M 4/04* (2006.01)
*H01M 10/0525* (2010.01)

(52) U.S. Cl.
CPC ......... *H01M 10/0585* (2013.01); *H01M 4/04* (2013.01); *H01M 10/0525* (2013.01)

(58) Field of Classification Search
CPC ............................ H01M 4/04; H01M 50/461
See application file for complete search history.

(56) References Cited

U.S. PATENT DOCUMENTS 6,610,353 B1 * 8/2003 Gibbons ................. H01M 6/12
156/60
7,055,570 B2 6/2006 Hong
(Continued)

FOREIGN PATENT DOCUMENTS

JP 2001345115 A 12/2001
JP 2004527095 A 9/2004
(Continued)

OTHER PUBLICATIONS

Machine translation of JP2016107642.*
(Continued)

*Primary Examiner* — Christopher T Schatz
(74) *Attorney, Agent, or Firm* — KENJA IP LAW PC (57) ABSTRACT

Provided is a method that enables efficient production of a laminate for a secondary battery including an electrode and a separator that are affixed to each other while also ensuring adhesive strength between the electrode and the separator. The method of producing a laminate for a secondary battery includes: a step (A) of forming an adhesive material on an affixing surface of at least one of an electrode and a separator; a step (B) of, after step (A), conveying the electrode and the separator to an affixing start position without bringing another member into contact with the affixing surface on which the adhesive material has been formed; and a step (C) of, after step (B), affixing the electrode and the separator to each other via the affixing surface. The formed amount of the adhesive material in step (A) is not less than 0.1 g/m² and not more than 100 g/m².

4 Claims, 2 Drawing Sheets

(56) References Cited

U.S. PATENT DOCUMENTS

| | | | |
|---|---|---|---|
| 11,189,860 B2 | 11/2021 | Aritomo et al. | |
| 2002/0107140 A1* | 8/2002 | Hampden-Smith | B01J 35/002 |
| | | | 429/534 |
| 2011/0146064 A1 | 6/2011 | Feaver et al. | |
| 2013/0316219 A1 | 11/2013 | Ha et al. | |
| 2015/0179997 A1* | 6/2015 | Iwai | H01M 50/414 |
| | | | 429/145 |
| 2015/0311490 A1 | 10/2015 | Murase et al. | |

FOREIGN PATENT DOCUMENTS

| | | | |
|---|---|---|---|
| JP | 2009072794 A | 4/2009 | |
| JP | 2012160352 A | 8/2012 | |
| JP | 2012204303 A | 10/2012 | |
| JP | 2013503456 A | 1/2013 | |
| JP | 2013145763 A | 7/2013 | |
| JP | 2014534570 A | 12/2014 | |
| JP | 2015041603 A | 3/2015 | |
| JP | 2015138770 A | 7/2015 | |
| JP | 2016107642 A | 6/2016 | |
| WO | 2010087123 A1 | 8/2010 | |
| WO | 2018021263 A1 | 2/2018 | |

OTHER PUBLICATIONS

Apr. 2, 2019, International Search Report issued in the International Patent Application No. PCT/JP2019/003729.

Aug. 27, 2020, International Preliminary Report on Patentability issued in the International Patent Application No. PCT/JP2019/003729.

Oct. 21, 2021, the Extended European Search Report issued by the European Patent Office in the corresponding European Patent Application No. 19756683.9.

* cited by examiner

METHOD OF PRODUCING LAMINATE FOR SECONDARY BATTERY

TECHNICAL FIELD

The present disclosure relates to a method of producing a laminate for a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as a positive electrode, a negative electrode, and a separator that isolates the positive electrode and the negative electrode from each another and prevents short circuiting between the positive and negative electrodes.

In a production process of a secondary battery, there are cases in which an electrode and a separator that have not yet been immersed in electrolyte solution are pressure bonded to obtain a laminate (hereinafter, also referred to as a "laminate for a secondary battery") and are then cut to a desired size and/or stacked, folded, or wound up, as necessary. Misalignment or the like of the pressure bonded electrode and separator may occur during this cutting, stacking, folding, or winding, leading to problems such as the occurrence of faults and reduction of productivity.

In recent years, techniques have been proposed for achieving good adhesion of an electrode and a separator in a production process of a secondary battery by using a separator that includes an adhesive layer at the surface thereof. Specifically, in Patent Literature (PTL) 1, for example, a coating solution containing inorganic particles and a binder polymer is applied onto a porous substrate and is dried to form a porous coating layer, and then a binder solution having a specific surface energy and contact angle is applied onto the surface of the porous coating layer and is dried to produce a separator that includes the porous coating layer and an adhesive layer on the porous substrate and that is then used in assembly of a secondary battery.

After the adhesive layer of a battery member that includes an adhesive layer (for example, a separator that includes an adhesive layer) has been formed, the battery member is generally stored in a wound-up state as a roll until the battery member is used in formation of a laminate for a secondary battery (for example, refer to PTL 2).

CITATION LIST

Patent Literature

PTL 1: JP2014-534570A
PTL 2: JP2015-41603A

SUMMARY

Technical Problem

However, when a battery member that includes an adhesive layer is stored in a wound-up state as a roll, adjacent battery members may become stuck together via the adhesive layer (i.e., blocking may occur). Moreover, when a battery member that includes an adhesive layer is fed out from a roll in production of a laminate for a secondary battery, if battery members have become stuck together, it may be necessary to perform work to peel apart the stuck together battery members and the adhesive layer may be peeled off, resulting in reduced productivity.

Accordingly, an object of the present disclosure is to provide a method that enables efficient production of a laminate for a secondary battery including an electrode and a separator that are affixed to each other while also ensuring adhesive strength between the electrode and the separator.

Solution to Problem

The inventors conducted diligent investigation with the aim of solving the problems set forth above. The inventors discovered that a laminate for a secondary battery including an electrode and a separator that are affixed to each other can be efficiently produced while also ensuring adhesive strength between the electrode and the separator by, in production of the laminate for a secondary battery, setting the amount of an adhesive material formed on an affixing surface within a specific range and by affixing the electrode and the separator to each other without bringing another member into contact with the affixing surface on which the adhesive material has been formed after forming the adhesive material. In this manner, the inventors completed the present disclosure.

Specifically, the present disclosure aims to advantageously solve the problem set forth above, and a presently disclosed method of producing a laminate for a secondary battery is a method of producing a laminate for a secondary battery including an electrode and a separator that are affixed to each other, comprising: a step (A) of forming an adhesive material on an affixing surface of at least one of the electrode and the separator; a step (B) of, after the step (A), conveying the electrode and the separator to an affixing start position without bringing another member into contact with the affixing surface on which the adhesive material has been formed; and a step (C) of, after the step (B), affixing the electrode and the separator to each other via the affixing surface, wherein a formed amount of the adhesive material in the step (A) is not less than $0.1$ $g/m^2$ and not more than $100$ $g/m^2$. By setting the amount of the adhesive material formed in step (A) within a specific range and by affixing the electrode and the separator to each other without bringing another member into contact with the affixing surface on which the adhesive material has been formed in step (B) and step (C) in this manner, the electrode and the separator can be sufficiently adhered to each other while also efficiently producing a laminate for a secondary battery compared to a case in which a battery member (electrode and/or separator) on which an adhesive material has been formed is temporarily wound up as a roll and stored, for example.

The term "affixing start position" as used in the present disclosure refers to a position at which an affixing surface of an electrode and an affixing surface of a separator are brought into contact when the electrode and the separator are being affixed to each other. Moreover, the "formed amount of the adhesive material" referred to in the present disclosure is the amount of the adhesive material that is formed per unit area of the affixing surface and can be calculated by dividing the mass of the adhesive material that is formed on the affixing surface by the area of the affixing surface on which the adhesive material has been formed. Note that the "area of the affixing surface" refers to the area of a section where the electrode and the separator are in contact when they are affixed to each other (i.e., in a case in which one of the electrode and the separator is smaller than the other, the area of the affixing surface of the electrode and the separator corresponds to the area of the affixing surface of whichever of the electrode and the separator is smaller).

In the presently disclosed method of producing a laminate for a secondary battery, the adhesive material is preferably formed of a polymer. When an adhesive material formed of a polymer is used, the electrode and the separator can be well adhered to each other.

In the presently disclosed method of producing a laminate for a secondary battery, the polymer preferably includes a low-Tg polymer having a glass-transition temperature of 25° C. or lower. When a polymer including a low-Tg polymer is used as the adhesive material, the adhesive strength between the electrode and the separator can be further increased.

Note that the "glass-transition temperature" referred to in the present disclosure can be measured in accordance with JIS K7121.

In the presently disclosed method of producing a laminate for a secondary battery, it is preferable that a composition for adhesion containing the adhesive material and a solvent is supplied to the affixing surface in the step (A), and an amount of coarse particles having a diameter of 10 μm or more contained in the composition for adhesion is 100 ppm or less. When the amount of coarse particles is not more than the upper limit set forth above, the energy density of a secondary battery produced using the laminate for a secondary battery can be increased.

The "amount of coarse particles" referred to in the present disclosure can be measured by a measurement method described in the EXAMPLES section of the present specification.

In the presently disclosed method of producing a laminate for a secondary battery, it is preferable that the adhesive material is formed at one or more locations on the affixing surface in the step (A), and the adhesive material has a formation area of not less than 25 μm$^2$ and not more than 250,000 μm$^2$ per location. When the formation area of the adhesive material per location is within the range set forth above, the electrode and the separator can be well adhered to each other while also efficiently producing the laminate for a secondary battery.

In the presently disclosed method of producing a laminate for a secondary battery, formation of the adhesive material is preferably performed by an inkjet method in the step (A). When the adhesive material is formed by an inkjet method, even better adhesion of the electrode and the separator is possible.

Advantageous Effect

According to the present disclosure, it is possible to efficiently produce a laminate for a secondary battery while also ensuring adhesive strength between an electrode and a separator.

DETAILED DESCRIPTION

The following provides a detailed description of embodiments of the present disclosure.

The presently disclosed method of producing a laminate for a secondary battery is used in production of a laminate for a secondary battery including an electrode (positive electrode and/or negative electrode) and a separator that are affixed to each other. Moreover, the laminate for a secondary battery that is produced using the presently disclosed method of producing a laminate for a secondary battery can be used in production of a secondary battery such as a non-aqueous secondary battery (for example, a lithium ion secondary battery).

Note that the presently disclosed method of producing a laminate for a secondary battery is particularly suitable for use in continuous production of a laminate for a secondary battery.

(Method of Producing Laminate for Secondary Battery)

The presently disclosed method of producing a laminate for a secondary battery is a method of affixing an electrode and a separator to each other to produce a laminate for a secondary battery. In the presently disclosed method of producing a laminate for a secondary battery, a laminate for a secondary battery is produced by implementing a step (A) of forming an adhesive material on an affixing surface of at least one of an electrode and a separator in an amount of not less than 0.1 g/m$^2$ and not more than 100 g/m$^2$, subsequently implementing a step (B) of conveying the electrode and the separator to an affixing start position without bringing another member into contact with the affixing surface on which the adhesive material has been formed, and further implementing a step (C) of affixing the electrode and the separator to each other via the affixing surface. By conveying the electrode and the separator to the affixing start position and affixing them to each other without bringing another member into contact with the affixing surface on which the adhesive material has been formed in this manner, blocking of the battery member (electrode and/or separator) on which the adhesive material has been formed does not occur. Moreover, when the formed amount of the adhesive material is within a specific range, the electrode and the separator can be sufficiently adhered to each other even in a case in which the battery member (electrode and/or separator) on which the adhesive material has been formed is used in the affixing in that state. This enables efficient production of a laminate for a secondary battery.

<Laminate for Secondary Battery>

The laminate for a secondary battery produced by the presently disclosed production method is a laminate in which the electrode and the separator are affixed to each other via the affixing surface. The electrode that is affixed to the separator and is a constituent of the laminate for a secondary battery may be just a positive electrode, just a negative electrode, or both a positive electrode and a negative electrode. Moreover, in a case in which both a positive electrode and a negative electrode are affixed to a separator to obtain the laminate for a secondary battery, the number of positive electrodes, the number of negative electrodes, and the number of separators included in the laminate for a secondary battery may be 1 or may be 2 or more.

In other words, the structure of the laminate for a secondary battery that is produced using the presently disclosed production method may be any of the following structures (1) to (6).

(1) Positive electrode/Separator
(2) Negative electrode/Separator
(3) Positive electrode/Separator/Negative electrode
(4) Positive electrode/Separator/Negative electrode/Separator (5) Separator/Positive electrode/Separator/Negative electrode
(6) Structure in which positive electrodes and negative electrodes are stacked alternately with separators in-between (for example, "separator/negative electrode/separator/positive electrode/separator/negative electrode . . . /separator/positive electrode", etc.)

Note that a laminate for a secondary battery that includes a plurality of electrodes and/or separators can be produced by repeatedly implementing the above-described steps (A) to (C).

<Electrode>

The electrode is not specifically limited and can, for example, be an electrode formed of an electrode substrate including an electrode mixed material layer formed at one side or both sides of a current collector or an electrode further including a porous membrane layer formed on an electrode mixed material layer of an electrode substrate.

The current collector, electrode mixed material layer, and porous membrane layer are not specifically limited and can be any current collector, electrode mixed material layer, and porous membrane layer that can be used in the field of secondary batteries, such as any of those described in JP2013-145763A, for example. The porous membrane layer is a layer containing non-conductive particles such as described in JP2013-145763A, for example.

The electrode used in production of the laminate for a secondary battery may be wound up as a roll or may be cut up in advance.

<Separator>

The separator is not specifically limited and can, for example, be a separator formed of a separator substrate or a separator including a porous membrane layer formed at one side or both sides of a separator substrate.

The separator substrate and the porous membrane layer are not specifically limited and can be any separator substrate and porous membrane layer that can be used in the field of secondary batteries, such as any of those described in JP2012-204303A and JP2013-145763A, for example.

The separator used in production of the laminate for a secondary battery may be wound up as a roll or may be cut up in advance. In particular, the separator is preferably a separator that is wound up as a roll from a viewpoint that continuous production of a laminate for a secondary battery can be performed efficiently.

<Adhesive Material>

The adhesive material that adheres the electrode and the separator to each other can be any adhesive material that is used in the field of secondary batteries without any specific limitations so long as it enables adhesion of the electrode and the separator and does not interfere with battery reactions. In particular, the adhesive material is preferably an adhesive material formed of a polymer from a viewpoint of adhering the electrode and the separator well to each other. Note that the constituent polymer of the adhesive material may be just one type of polymer or two or more types of polymers.

Examples of polymers that can be used as the adhesive material include, but are not specifically limited to, fluoropolymers such as polyvinylidene fluoride and polyvinylidene fluoride-hexafluoropropylene (PVdF-HFP) copolymer; conjugated diene polymers such as styrene-butadiene copolymer (SBR) and acrylonitrile-butadiene copolymer (NBR); hydrogenated products of conjugated diene polymers; polymers including a (meth)acrylic acid alkyl ester monomer unit (acrylic polymers); and polyvinyl alcohol polymers such as polyvinyl alcohol (PVA).

Note that in the present disclosure, "(meth)acrylic acid" indicates "acrylic acid" and/or "methacrylic acid".

The form of the adhesive material formed of a polymer is not specifically limited and may be a particulate form, a non-particulate form, or a combination of a particulate form and a non-particulate form.

Note that in a case in which the adhesive material formed of a polymer has a particulate form, the particulate adhesive material may be monophase structure particles formed from a single polymer or may be heterophase structure particles formed through physical or chemical bonding of two or more different polymers. Specific examples of heterophase structures include a core-shell structure in which a central portion (core portion) and an outer shell portion (shell portion) of spherical particles are formed from different polymers; and a side-by-side structure in which two or more polymers are adjacent to each other. Note that the term "core-shell structure" as used in the present disclosure is inclusive of a structure in which a shell portion completely covers the outer surface of a core portion and also a structure in which a shell portion partially covers the outer surface of a core portion. In terms of external appearance, even in a situation in which the outer surface of a core portion appears to be completely covered by a shell portion, the shell portion is still considered to be a shell portion that partially covers the outer surface of the core portion so long as pores are formed that pass between inside and outside of the shell portion.

In a case in which the adhesive material formed of a polymer has a particulate form, the volume-average particle diameter of the particulate adhesive material is preferably 0.1 µm or more, more preferably 0.15 µm or more, and even more preferably 0.18 µm or more, and is preferably 5 µm or less, more preferably 3 µm or less, and even more preferably 2 µm or less. When the volume-average particle diameter of the particulate adhesive material is not less than any of the lower limits set forth above, adhesive strength between the electrode and the separator can be increased. Moreover, when the volume-average particle diameter of the particulate adhesive material is not more than any of the upper limits set forth above, the energy density of a secondary battery produced using the laminate for a secondary battery can be increased.

The "volume-average particle diameter" referred to in the present disclosure represents the particle diameter at which, in a volume-basis particle diameter distribution measured by laser diffraction, cumulative volume calculated from the small diameter end of the distribution reaches 50%.

Moreover, in a case in which the particulate adhesive material includes a polymer having a core-shell structure, the volume-average particle diameter of the polymer having the core-shell structure is preferably 0.1 µm or more, more preferably 0.15 µm or more, and even more preferably 0.2 µm or more, and is preferably 5 µm or less, more preferably 3 µm or less, and even more preferably 2 µm or less. When the volume-average particle diameter of the adhesive material formed of a polymer having a core-shell structure is not less than any of the lower limits set forth above, adhesive strength between the electrode and the separator can be increased. Moreover, when the volume-average particle diameter of the adhesive material formed of a polymer having a core-shell structure is not more than any of the upper limits set forth above, the energy density of a secondary battery produced using the laminate for a secondary battery can be increased.

Furthermore, in a case in which the particulate adhesive material includes a polymer having a core-shell structure, a ratio (D10/D50) of a particle diameter (D10) at which cumulative volume calculated from a small diameter end of a volume-basis particle diameter distribution reaches 10% relative to the volume-average particle diameter (D50) of the adhesive material formed of the polymer having the core-shell structure is preferably not less than 0.5 and not more than 1.0, more preferably not less than 0.55 and not more than 1.0, and even more preferably not less than 0.6 and not more than 1.0. When D10/D50 is not less than any of the lower limits set forth above, adhesive strength between the electrode and the separator can be increased.

Moreover, in a case in which the particulate adhesive material includes a polymer having a core-shell structure, a ratio (D90/D50) of a particle diameter (D90) at which cumulative volume calculated from a small diameter end of a volume-basis particle diameter distribution reaches 90% relative to the volume-average particle diameter (D50) of the adhesive material formed of the polymer having the core-shell structure is preferably 1.5 or less, more preferably 1.45 or less, and even more preferably 1.4 or less. When D90/D50 is not more than any of the upper limits set forth above, adhesive strength between the electrode and the separator can be increased.

Also, in a case in which the particulate adhesive material includes a polymer having a core-shell structure, the diameter of the core portion of the polymer having the core-shell structure when the volume-average particle diameter of the polymer having the core-shell structure is taken to be 100% is preferably not less than 5% and less than 100%, more preferably not less than 10% and less than 100%, and even more preferably not less than 20% and less than 100%. When the diameter of the core portion is not less than any of the lower limits set forth above, the polymer can maintain a particulate form well even after being supplied to the affixing surface, and the electrode and the separator can be well adhered to each other.

Furthermore, in a case in which the adhesive material is formed of a polymer, the constituent polymer of the adhesive material preferably includes a low-Tg polymer having a glass-transition temperature of 25° C. or lower. When the constituent polymer of the adhesive material includes a low-Tg polymer, adhesive strength between the electrode and the separator can be increased. Note that the glass-transition temperature of the low-Tg polymer is preferably −120° C. or higher.

Also note that in a case in which the adhesive material includes a polymer having a core-shell structure, the glass-transition temperature of the core portion is preferably higher than the glass-transition temperature of the shell portion in the polymer having the core-shell structure. When the glass-transition temperature of the core portion is higher than the glass-transition temperature of the shell portion, the polymer can maintain a particulate form well even after being supplied to the affixing surface while also causing the shell portion to display sufficiently high adhesive strength and achieving good adhesion of the electrode and the separator to each other.

The glass-transition temperature of the core portion of the polymer having the core-shell structure is preferably not lower than −40° C. and not higher than 110° C., more preferably not lower than −40° C. and not higher than 60° C., and even more preferably not lower than −40° C. and not higher than 25° C. When the glass-transition temperature of the core portion is not lower than any of the lower limits set forth above, the polymer can maintain a particulate form well even after being supplied to the affixing surface. Moreover, when the glass-transition temperature of the core portion is not higher than any of the upper limits set forth above, the electrode and the separator can be well adhered to each other.

The glass-transition temperature of the shell portion of the polymer having the core-shell structure is preferably −40° C. or higher, more preferably −35° C. or higher, and even more preferably −30° C. or higher, and is preferably 50° C. or lower, more preferably 40° C. or lower, even more preferably 30° C. or lower, and particularly preferably 25° C. or lower. When the glass-transition temperature of the shell portion is not lower than any of the lower limits set forth above, the polymer can maintain a particulate form well even after being supplied to the affixing surface. Moreover, when the glass-transition temperature of the shell portion is not higher than any of the upper limits set forth above, the electrode and the separator can be well adhered to each other.

The polymer having the core-shell structure preferably has at least one glass-transition temperature that is 25° C. or lower.

<Step (A)>

In step (A), the adhesive material described above is formed on an affixing surface of at least one of the electrode and the separator.

The amount of the adhesive material that is formed on the affixing surface is required to be not less than 0.1 g/m² and not more than 100 g/m², and is preferably not less than 0.1 g/m² and not more than 50 g/m², more preferably not less than 0.1 g/m² and not more than 10 g/m², and even more preferably not less than 0.1 g/m² and not more than 1 g/m². When the formed amount of the adhesive material is 0.1 g/m² or more, the electrode and the separator can be sufficiently adhered to each other. Moreover, when the formed amount of the adhesive material is 100 g/m² or less, the laminate for a secondary battery can be efficiently produced.

In a case in which the adhesive material is formed on both an electrode-side affixing surface and a separator-side affixing surface, the formed amount of the adhesive material at each of the affixing surfaces should be not less than 0.1 g/m² and not more than 100 g/m².

Note that the adhesive material can be supplied to the affixing surface in any state, such as a solid state, a molten state, a dissolved state in a solvent, or a dispersed state in a solvent. Of these examples, it is preferable that the adhesive material is supplied in a dissolved state in a solvent or a dispersed state in a solvent, and more preferable that the adhesive material is supplied in a dispersed state in a solvent.

In a case in which the adhesive material is supplied to the affixing surface in a dissolved state in a solvent or a dispersed state in a solvent in step (A) (i.e., in a case in which a composition for adhesion containing the adhesive material and a solvent is supplied to the affixing surface), the solvent of the composition for adhesion can be water, an organic solvent, or a mixture thereof, for example, without any specific limitations. Examples of organic solvents that can be used include, but are not specifically limited to, alicyclic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; nitriles such as acetonitrile and propionitrile; ethers such as tetrahydrofuran and ethylene glycol diethyl ether; and alcohols such as methanol, ethanol, isopropanol, ethylene glycol, and ethylene glycol monomethyl ether.

Of these examples, water and alcohols are preferable as the solvent from a viewpoint of efficiently producing the laminate for a secondary battery, with water being more preferable.

The concentration of the adhesive material in the composition for adhesion is preferably not less than 1 mass % and not more than 40 mass %, more preferably not less than 1 mass % and not more than 30 mass %, and even more preferably not less than 1 mass % and not more than 15 mass %. When the concentration of the adhesive material is within any of the ranges set forth above, the laminate for a secondary battery can be produced more efficiently.

The viscosity of the composition for adhesion is preferably not less than 1 mPa·s and not more than 50 mPa·s, more preferably not less than 1 mPa·s and not more than 40 mPa·s, and even more preferably not less than 1 mPa·s and not more than 30 mPa·s. When the viscosity of the composition for adhesion is within any of the ranges set forth above, the composition for adhesion can easily be supplied to a desired position on the affixing surface and the desired formed amount can be achieved, and thus the electrode and the separator can be well adhered to each other.

The "viscosity" referred to in the present disclosure is the value of the static viscosity at a temperature of 20° C. as measured using a Brookfield viscometer (B-type viscometer).

The surface tension of the composition for adhesion is preferably 10 mN/m or more, more preferably 15 mN/m or more, and even more preferably 20 mN/m or more, and is preferably 72 mN/m or less, more preferably 70 mN/m or less, and even more preferably 65 mN/m or less. When the surface tension of the composition for adhesion is not less than any of the lower limits set forth above, the composition for adhesion can be supplied onto the affixing surface in a desired shape, the desired formed amount can be achieved, and the laminate for a secondary battery can be produced more efficiently. Moreover, when the surface tension of the composition for adhesion is not more than any of the upper limits set forth above, the composition for adhesion can be supplied to a desired position on the affixing surface, and the electrode and the separator can be well adhered to each other.

The "surface tension" referred to in the present disclosure is a value measured in accordance with JIS K2241.

The amount of coarse particles having a diameter of 10 μm or more contained in the composition for adhesion is preferably 100 ppm or less, more preferably 50 ppm or less, and even more preferably 10 ppm or less. When the amount of coarse particles is not more than any of the upper limits set forth above, the energy density of a secondary battery produced using the laminate for a secondary battery can be increased. Note that coarse particles contained in the composition for adhesion are normally formed of a particulate adhesive material that is formed of a polymer.

Formation of the adhesive material at the affixing surface can be performed by a method such as an inkjet method, a spraying method, a dispensing method, a gravure coating method, a screen printing method, or the like, for example, without any specific limitations. Of these methods, an inkjet method is preferable as the formation method of the adhesive material from a viewpoint of high productivity and freedom of formation shape.

Note that the adhesive material may be formed over the entirety of the affixing surface or may be formed on just part of the affixing surface. In a case in which the adhesive material is formed on just part of the affixing surface, the adhesive material can be formed such as to have any shape in plan-view, such as a striped shape, a dotted shape, or a lattice shape. Of these examples, formation of the adhesive material in a dotted shape is preferable from a viewpoint of increasing injectability of electrolyte solution in production of a secondary battery using the laminate for a secondary battery. The dotted adhesive material may be disposed (formed) uniformly over the entirety of the affixing surface or may be disposed (formed) in an array such as to form a specific pattern such as a striped pattern, a dotted pattern, or a lattice pattern. Of these examples, it is preferable that the dotted adhesive material is disposed (formed) in a striped array from a viewpoint of increasing injectability of electrolyte solution in production of a secondary battery using the laminate for a secondary battery. Note that in a case in which a fine dotted adhesive material is arranged in a specific pattern, it is preferable that the adhesive material is formed by applying the composition for adhesion in the desired pattern by an inkjet method from a viewpoint of ease of formation and arrangement of the adhesive material.

The cross-sectional shape of the adhesive material can be a protruding shape, a protruding/depressed shape, or a depressed shape without any specific limitations, and is preferably a protruding/depressed shape from a viewpoint of achieving even better adhesion between the electrode and the separator. Note that the cross-sectional shape of the adhesive material can be altered by adjusting the drying conditions in formation of the adhesive material using the composition for adhesion, for example.

In a case in which the adhesive material is formed at one or more locations, and preferably two or more locations, on the affixing surface, the formation area of the adhesive material formed on the affixing surface is preferably 25 $\mu m^2$ or more, more preferably 50 $\mu m^2$ or more, and even more preferably 100 $\mu m^2$ or more per location, and is preferably 250,000 $\mu m^2$ or less, more preferably 200,000 $\mu m^2$ or less, and even more preferably 100,000 $\mu m^2$ or less per location. When the formation area of the adhesive material is 25 $\mu m^2$ or more per location, the electrode and the separator can be sufficiently adhered to each other. Moreover, when the formation area of the adhesive material is 250,000 $\mu m^2$ or less per location, the laminate for a secondary battery can be efficiently produced.

Note that the formation area can be adjusted by altering the amount, shape, and range of application of the adhesive material or the composition for adhesion on the affixing surface. Specifically, in a case in which the adhesive material is formed by an inkjet method using a composition for adhesion, for example, the formation area can be adjusted by altering the gradation of ejection of the composition for adhesion from nozzles of an inkjet head (i.e., the number of ejections at the same point).

<Step (B)>

In step (B), the electrode and the separator are conveyed to an affixing start position without bringing another member into contact with the affixing surface on which the adhesive material has been formed. By not bringing another member into contact with the affixing surface on which the adhesive material has been formed in this manner, problems such as blocking do not occur, which makes it possible to use an adhesive material having excellent adhesiveness and to efficiently produce the laminate for a secondary battery.

Note that the conveying of the electrode and the separator can be performed by any conveying mechanism such as a roller, a belt conveyor, a manipulator, or a suction band, for example, without any specific limitations. Of these examples, it is preferable that at least one of the electrode and the separator is conveyed by a roller from a viewpoint of further increasing production efficiency of the laminate for a secondary battery.

In a case in which the adhesive material is supplied as a composition for adhesion in step (A), the composition for adhesion on the affixing surface may be dried during the conveying in step (B). The drying can be performed using a heating device such as a heater, a dryer, a heating roller, or the like without any specific limitations. The temperature of the electrode and/or separator to which the composition for adhesion has been supplied during drying is not specifically limited but is preferably 0° C. or higher, more preferably 10° C. or higher, and even more preferably 15° C. or higher, and is preferably 200° C. or lower, more preferably 150° C. or lower, and even more preferably 100° C. or lower. When the temperature during drying is not lower than any of the lower limits set forth above, the drying rate can be sufficiently increased, and the laminate for a secondary battery can be efficiently produced. Moreover, when the temperature during drying is not higher than any of the upper limits set forth above, the adhesive material can be provided with a good post-drying shape, and the electrode and the separator can be well adhered to each other.

<Step (C)>

In step (C), the electrode and the separator are affixed to each other via the affixing surface. This affixing can be performed through pressing and/or heating of a laminate in which the electrode and the separator are stacked via the affixing surface, for example, but is not specifically limited to being performed in this manner.

Note that the pressure applied to the laminate, the temperature when affixing the electrode and the separator to each other, and the duration of pressing and/or heating of the laminate can be set as appropriate depending on the type and amount of the used adhesive material, for example.

<Example of Production Apparatus of Laminate for Secondary Battery>

Figure 1:
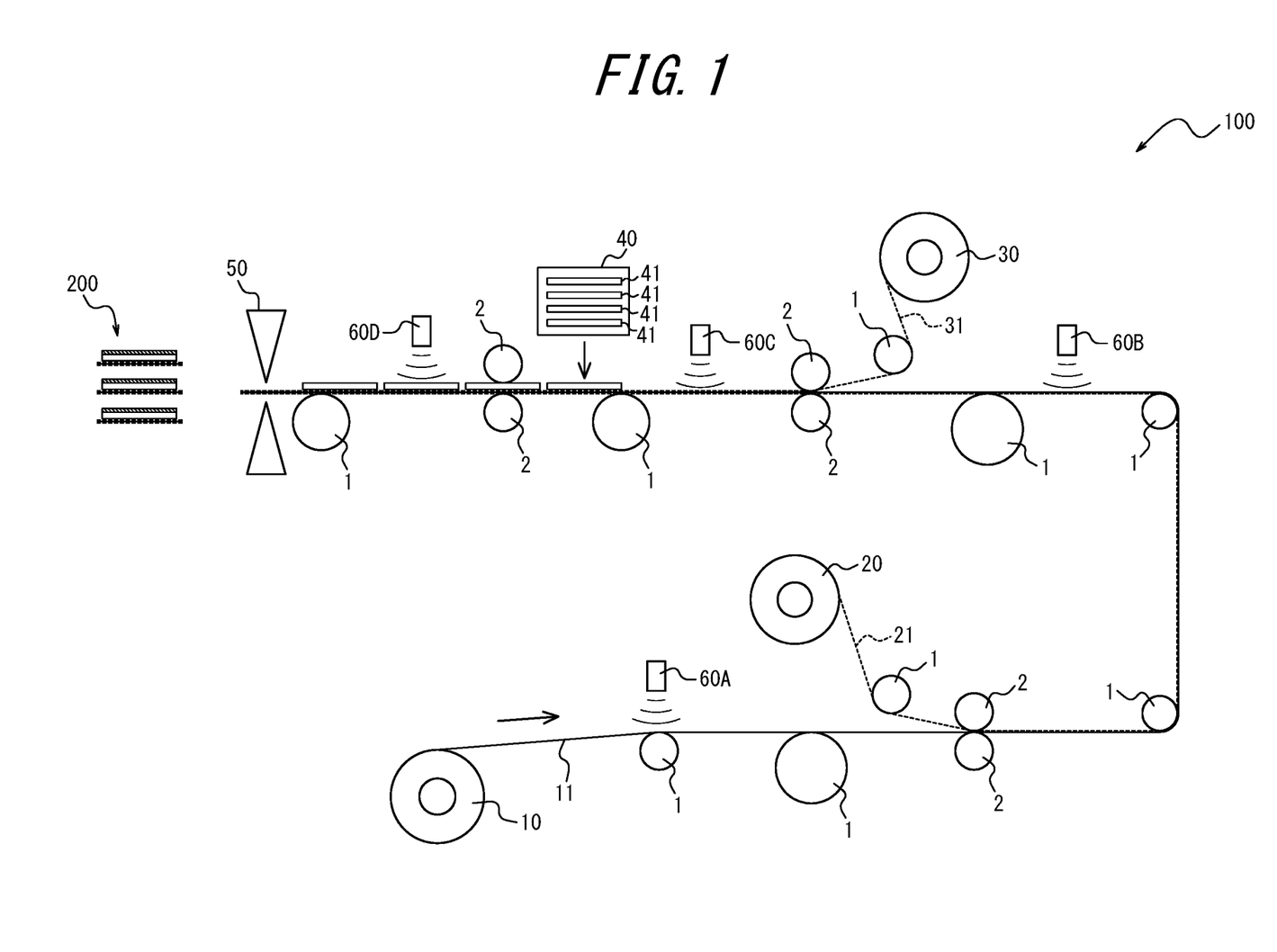
FIG. 1 is an explanatory drawing illustrating schematic configuration of an example of a production apparatus of a laminate for a secondary battery.

Production of a laminate for a secondary battery using the presently disclosed method of producing a laminate for a secondary battery can be performed using a production apparatus 100 such as illustrated in FIG. 1, for example, but is not specifically limited to being performed in this manner.

The production apparatus 100 illustrated in FIG. 1 is an apparatus that produces a laminate 200 for a secondary battery in which electrodes (positive electrode and negative electrode) and separators are stacked in an order of "positive electrode/separator/negative electrode/separator" from top to bottom. Note that in this production apparatus 100, the obtained laminate 200 for a secondary battery is cut to an appropriate size and then further stacked before being used in secondary battery production.

The production apparatus 100 includes a negative electrode roll 10 that is obtained by winding up a negative electrode 11 as a roll, a first separator roll 20 and a second separator roll 30 that are obtained by winding up separators 21 and 31, respectively, as rolls, and a positive electrode stocker 40 that houses pre-cut positive electrodes 41. The production apparatus 100 further includes a plurality of (9 in the illustrated example) conveying rollers 1, a plurality of (3 pairs in the illustrated example) pressing rollers 2, a plurality of (4 in the illustrated example) adhesive material feeders 60A, 60B, 60C, and 60D, and a cutting machine 50.

Figure 2:
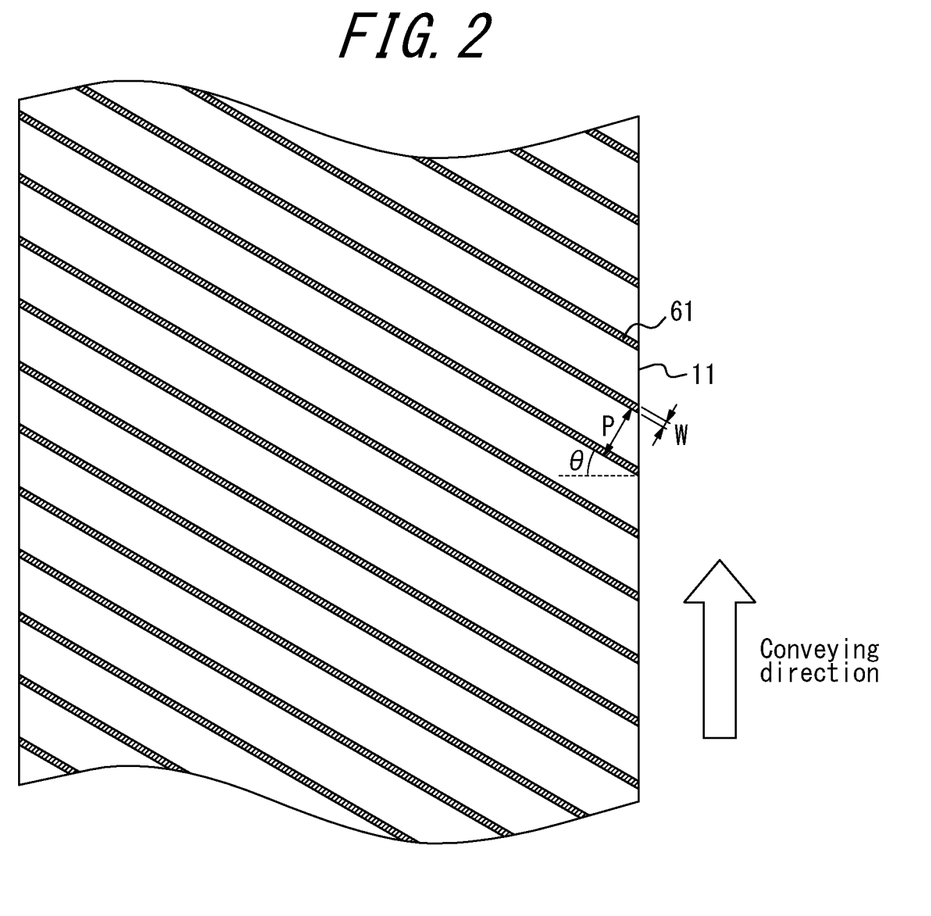
FIG. 2 is a plan view illustrating an example of a coating pattern of a composition for adhesion.

In the production apparatus 100, a composition for adhesion 61 containing an adhesive material is first supplied from the adhesive material feeder 60A to a surface (upper surface in the illustrated example) of a negative electrode 11 that has been fed out from the negative electrode roll 10 and conveyed via a conveying roller 1 such that the composition for adhesion 61 forms a coating pattern having a diagonally striped shape such as illustrated in FIG. 2, for example (step (A)). In plan view, the diagonally striped coating pattern illustrated in FIG. 2 has an angle formed with a direction orthogonal to the conveying direction (measured from a narrow angle side) of θ, an arrangement pitch of P, and a width of W. The negative electrode 11 that has been supplied with the adhesive material and a separator 21 that has been fed out from the first separator roll 20 are conveyed to an affixing start position at which pressing rollers 2 are located (step (B)), and are affixed to each other by the pressing rollers 2 (step (C)).

Note that in a case in which a composition for adhesion is supplied from the adhesive material feeder 60A, the composition for adhesion may be dried by using a heating roller as a conveying roller 1 that is located between the adhesive material feeder 60A and the pressing rollers 2 in the production apparatus 100.

Moreover, in the production apparatus 100, a composition for adhesion 61 containing an adhesive material is supplied from the adhesive material feeder 60B to a surface at the negative electrode 11 side of the laminate in which the negative electrode 11 and the separator 21 have been affixed using the adhesive material such that the composition for adhesion 61 forms a coating pattern having a diagonally striped shape such as illustrated in FIG. 2, for example (step (A)). The laminate of the negative electrode 11 and the separator 21 that has been supplied with the adhesive material and a separator 31 that has been fed out from the second separator roll 30 are conveyed to an affixing start position at which pressing rollers 2 are located (step (B)), and are affixed to each other by the pressing rollers 2 (step (C)).

Note that in a case in which a composition for adhesion is supplied from the adhesive material feeder 60B, the composition for adhesion may be dried by using a heating roller as a conveying roller 1 that is located between the adhesive material feeder 60B and the pressing rollers 2 in the production apparatus 100.

Furthermore, in the production apparatus 100, a composition for adhesion 61 containing an adhesive material is supplied from the adhesive material feeder 60C to a surface at the separator 31 side of the laminate in which the negative electrode 11 and the separators 21 and 31 have been affixed to each other using the adhesive material such that the composition for adhesion 61 forms a coating pattern having a diagonally striped shape like that illustrated in FIG. 2, for example (step (A)). At an affixing start position, a positive electrode 41 is placed on the separator 31 of the laminate of the negative electrode 11 and the separators 21 and 31 that has been supplied with the adhesive material (step (B)), and the positive electrode 41 and the separator 31 are affixed by pressing rollers 2 (step (C)).

Note that in a case in which a composition for adhesion is supplied from the adhesive material feeder 60C, the composition for adhesion may be dried by using a heating roller as a conveying roller 1 that is located between the adhesive material feeder 60C and the pressing rollers 2 in the production apparatus 100.

In addition, in the production apparatus 100, a composition for adhesion 61 containing an adhesive material is supplied from the adhesive material feeder 60D to a surface at the positive electrode side of the laminate 200 for a secondary battery in which stacking has been performed in an order of "positive electrode/separator/negative electrode/separator" from top to bottom such that the composition for adhesion 61 forms a coating pattern having a diagonally striped shape like that illustrated in FIG. 2, for example, and the laminate 200 for a secondary battery is subsequently cut by the cutting machine 50.

Note that laminates obtained through cutting of the laminate 200 for a secondary battery by the cutting machine 50 are further stacked before being used in secondary battery production.

(Production Method of Secondary Battery)

A method of producing a secondary battery using a laminate for a secondary battery includes a step of producing a laminate for a secondary battery using the presently disclosed method of producing a laminate for a secondary battery set forth above and a step of assembling a secondary battery using the laminate for a secondary battery and an electrolyte solution (assembly step).

<Assembly Step>

The electrolyte solution is normally an organic electrolyte solution obtained by dissolving a supporting electrolyte in an organic solvent. For example, a lithium salt is used as the supporting electrolyte in a case in which the secondary battery is a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents that can be used include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

The secondary battery can be assembled by further stacking an additional battery member (electrode and/or separator, etc.) with the laminate for a secondary battery produced according to the presently disclosed method of producing a laminate for a secondary battery, as necessary, subsequently performing rolling, folding, or the like of the resultant laminate in accordance with the battery shape, as necessary, to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

In the examples and comparative example, the following methods were used to measure and evaluate the glass-transition temperature, volume-average particle diameter D50, and particle diameter distribution of a constituent polymer of an adhesive material, the viscosity, surface tension, and content of coarse particles having a diameter of 10 μm or more of a composition for adhesion, the dry adhesive strength between an electrode and a separator, and the electrolyte solution injectability, output characteristics, and cycle characteristics of a secondary battery.

<Glass-Transition Temperature>

Glass-transition temperature measurement was performed in accordance with JIS K7121 at a measurement temperature of −100° C. to 180° C. and a heating rate of 5° C./min, using a differential scanning calorimeter (DSC6220SII produced by Nanotechnology).

<Volume-Average Particle Diameter D50 and Particle Diameter Distribution>

A particle diameter distribution (volume basis) was measured with respect to a water dispersion of a particulate polymer using a laser diffraction particle diameter distribution analyzer (produced by Shimadzu Corporation; product name: SALD-3100). In the measured particle diameter distribution, the particle diameter at which cumulative volume calculated from the small diameter end of the distribution reached 50% was taken to be the volume-average particle diameter (D50) of the particles. The measured particle diameter distribution was used to determine the particle diameter (D10) at which cumulative volume calculated from the small diameter end reached 10% and the particle diameter (D90) at which cumulative volume calculated from the small diameter end reached 90%, and to calculate D10/D50 and D90/D50.

<Viscosity>

The static viscosity at a temperature of 20° C. was measured with respect to a produced composition for adhesion using a Brookfield viscometer (DV1M produced by EKO Instruments Co., Ltd.)

<Surface Tension>

The surface tension at a temperature of 25° C. was measured in accordance with JIS K2241 with respect to a produced composition for adhesion using a surface tension meter (DY-700 produced by Kyowa Interface Science Co., Ltd.).

<Content of Coarse Particles>

A nylon mesh having an average pore diameter of 10 μm was set in a funnel after the mass (B) thereof had been measured. Next, 100 g of a composition for adhesion was poured into the funnel and was filtered. Deionized water was poured into the funnel to perform washing until clouding disappeared, and then drying was performed in a 90° C. oven for at least 60 minutes. The mass (A) of the nylon mesh was measured after it had been left to cool, and thus the amount of mesh residue was measured. The amount of mesh residue, which in other words is the amount of coarse particles having a particle diameter of 10 μm or more in the composition for adhesion, was calculated by the following formula.

Content of coarse particles (ppm)=$(A-B)/(C\times D/100)\times 1{,}000{,}000$

A: Mass (g) of mesh and dried material
B: Mass (g) of mesh
C: Mass (g) of filtered composition for adhesion
D: Total solid content concentration (%) of composition for adhesion <Formation Area of Adhesive Material Per Location>

The major axis diameter x and the minor axis diameter y of a dotted adhesive material formed in a 2 mm² region were measured using a laser microscope (VR-3100 produced by Keyence Corporation), z=(x+y)/2 was taken to be the average value thereof, the area of each dot was calculated as $S=\frac{1}{4}\pi z^2$, and the formation area $S_{50}$ of the adhesive material per location was calculated as the average value of the areas S of 50 dots.

<Dry Adhesive Strength>

A positive electrode, a negative electrode, and a separator produced in each example or comparative example were each cut out as 10 mm in width and 50 mm in length. Laminates were obtained through stacking of a positive electrode with a separator or stacking of a negative electrode with a separator and were each pressed at 10 m/min by roll pressing with a pressure equivalent to a load of 1 MPa at a temperature of 70° C. to obtain a test specimen.

The test specimen was placed with the surface at the current collector side of the electrode (positive electrode or negative electrode) facing downward and cellophane tape was affixed to the surface of the electrode. Tape prescribed by JIS Z1522 was used as the cellophane tape. The cellophane tape was fixed to a horizontal test stage in advance. The stress when the separator was peeled off by pulling one end of the separator vertically upward at a pulling speed of 50 mm/min was measured.

This measurement was performed 3 times for laminates including a positive electrode and a separator and 3 times for laminates including a negative electrode and a separator (i.e., 6 times in total), the average value of the measured stresses was determined as the peel strength, and adhesiveness between an electrode and a separator was evaluated by the following standard. A larger peel strength indicates higher adhesiveness.

A: Peel strength of 3 N/m or more
B: Peel strength of not less than 1 N/m and less than 3 N/m
C: Peel strength of less than 1 N/m <Electrolyte Solution Injectability>

A produced laminate for a secondary battery was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected such that no air remained. This injection was performed with various different injection times.

The minimum injection time for which spillage of the electrolyte solution during injection did not occur was determined and was evaluated by the following standard. A shorter minimum injection time indicates better electrolyte solution injectability.

A: Minimum injection time of less than 100 s
B: Minimum injection time of not less than 100 s and less than 300 s
C: Minimum injection time of not less than 300 s and less than 500 s
D: Minimum injection time of 500 s or more <Output Characteristics>

A produced secondary battery was constant-current constant-voltage (CCCV) charged to 4.3 V in an atmosphere having a temperature of 25° C. Thereafter, the electric capacity when the secondary battery was discharged to 3.0 V by a 0.2 C constant-current method and the electric capacity when the secondary battery was discharged to 3.0 V by a 1 C constant-current method in an atmosphere having a temperature of −10° C. were determined.

A discharge capacity maintenance rate expressed by the ratio of the electric capacities (=(electric capacity at 1 C/electric capacity at 0.2 C)×100(%)) was calculated. These measurements were performed for five secondary battery cells and the average value of the discharge capacity maintenance rates of the cells was evaluated by the following standard as a low-temperature output characteristic. A larger value indicates better output characteristics.

A: Low-temperature output characteristic of 80% or more
B: Low-temperature output characteristic of not less than 70% and less than 80%
C: Low-temperature output characteristic of not less than 60% and less than 70%
D: Low-temperature output characteristic of less than 60%

<Cycle Characteristics>

A produced secondary battery was subjected to 200 cycles of charging to 4.4 V and discharging to 3.0 V by a 0.5 C constant-current method in an atmosphere having a temperature of 45° C. A charge/discharge capacity maintenance rate expressed by the ratio of the electric capacity at the end of 200 cycles and the electric capacity at the end of 5 cycles (=(electric capacity at end of 200 cycles/electric capacity at end of 5 cycles)×100(%)) was calculated. These measurements were performed for five secondary battery cells and the average value of the charge/discharge capacity maintenance rates of the cells was evaluated by the following standard as a high-voltage cycle characteristic. A larger value indicates better cycle characteristics.

A: High-voltage cycle characteristic of 95% or more
B: High-voltage cycle characteristic of not less than 90% and less than 95%
C: High-voltage cycle characteristic of less than 90%

Example 1

<Preparation of Adhesive Material>

A water dispersion of core-shell particles including a core portion formed of a polymer having a glass-transition temperature of 108° C. and a shell portion formed of a polymer having a glass-transition temperature of −17° C. and partially covering an outer surface of the core portion was prepared as a particulate first adhesive material formed of a polymer having a core-shell structure.

In addition, a water dispersion of a styrene-butadiene copolymer (SBR) was prepared as a particulate second adhesive material formed of a polymer having a monophase structure.

The glass-transition temperature, volume-average particle diameter D50, and particle diameter distribution of the constituent polymer of each adhesive material were measured. The results are shown in Table 1.

<Production of Composition for Adhesion>

Inside a stirring vessel, 10 parts in terms of solid content of the water dispersion of the second adhesive material and 100 parts in terms of solid content of the water dispersion of the first adhesive material were mixed and were diluted with deionized water to obtain a composition for adhesion having a solid content concentration of 10%.

The viscosity, surface tension, and content of coarse particles having a diameter of 10 μm or more were measured for the composition for adhesion.

The results are shown in Table 1.

<Formation of Negative Electrode>

A 5 MPa pressure vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. Once the polymerization conversion rate reached 96%, cooling was performed to quench the reaction to yield a mixture containing a binder for a negative electrode mixed material layer (SBR). The mixture containing the binder for a negative electrode mixed material layer was adjusted to pH 8 through addition of 5% sodium hydroxide aqueous solution and was then subjected to thermal-vacuum distillation to remove unreacted monomer. Thereafter, cooling was performed to 30° C. or lower to obtain a water dispersion containing the desired binder for a negative electrode mixed material layer.

Next, 100 parts of artificial graphite (volume-average particle diameter: 15.6 μm) as a negative electrode active material, 1 part in terms of solid content of a 2% aqueous solution of carboxymethyl cellulose sodium salt (produced by Nippon Paper Industries Co., Ltd.; product name: MAC350HC) as a viscosity modifier, and deionized water were mixed, were adjusted to a solid content concentration of 68%, and were then mixed at 25° C. for 60 minutes. The solid content concentration was further adjusted to 62% with deionized water and then a further 15 minutes of mixing was performed at 25° C. Deionized water and 1.5 parts in terms of solid content of the water dispersion containing the binder for a negative electrode mixed material layer described above were added to the resultant mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

The obtained slurry composition for a secondary battery negative electrode was applied onto copper foil (current collector) of 20 μm in thickness using a comma coater such as to have a thickness after drying of approximately 150 μm. The applied slurry composition was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode having a negative electrode mixed material layer thickness of 80 μm.

<Formation of Positive Electrode>

A slurry composition for a secondary battery positive electrode was obtained by mixing 100 parts of $LiCoO_2$ having a volume-average particle diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent, adjusting these materials to a total solid content concentration of 70%, and mixing these materials using a planetary mixer.

The obtained slurry composition for a secondary battery positive electrode was applied onto aluminum foil (current collector) of 20 μm in thickness using a comma coater such as to have a thickness after drying of approximately 150 μm. The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The obtained positive electrode web was rolled by a roll press to obtain a positive electrode including a positive electrode mixed material layer.

<Preparation of Separator>

A separator (product name: Celgard 2500) made of polypropylene (PP) was prepared.

<Production of Laminate for Secondary Battery>

A laminate for a lithium ion secondary battery was produced and cut by the production apparatus illustrated in FIG. 1 using the prepared composition for adhesion, negative electrode, positive electrode, and separator.

Note that an inkjet-type adhesive material feeder including an inkjet head (KM1024 (shear-mode type) produced by Konica) was used as an adhesive material feeder.

Moreover, the conveyance speed was set as 10 m/min, the composition for adhesion was supplied as a coating pattern having the striped shape illustrated in FIG. 2 (θ: 45°; P: 200 μm; W: 30 μm), and other production conditions were set as conditions shown in Table 1.

The supplied composition for adhesion was dried by using heating rollers as some of the conveying rollers. When the dried adhesive material was observed using a laser microscope, the adhesive material had a fine dotted form. In other words, a plurality of fine dots of the adhesive material were arranged in a diagonally striped pattern on an affixing surface. Moreover, when the average height (thickness) and the maximum height (thickness) of the adhesive material were confirmed through observation of a cross-section using a laser microscope, the cross-section had a protruding/depressed shape, the average height was 1 μm, and the maximum height was 3 μm.

The dry adhesive strength of the laminate for a secondary battery was evaluated. The result is shown in Table 1.

<Production of Secondary Battery>

Five cut laminates for a secondary battery were stacked and were pressed at a temperature of 70° C. and a pressure of 1 MPa for 10 seconds to obtain a stack.

The produced stack was enclosed in an aluminum packing case serving as a battery case, and electrolyte solution (solvent: ethylene carbonate/diethyl carbonate/vinylene carbonate=68.5/30/1.5 (volume ratio); electrolyte: $LiPF_6$ of 1 M in concentration) was injected. An opening of the aluminum packing case was subsequently closed by heat sealing at 150° C. to produce a stacked lithium ion secondary battery having a capacity of 800 mAh.

The electrolyte solution injectability, output characteristics, and cycle characteristics of the secondary battery were evaluated. The results are shown in Table 1.

Example 2

An adhesive material, a composition for adhesion, a negative electrode, a positive electrode, a separator, a laminate for a secondary battery, and a secondary battery were prepared or produced in the same way as in Example 1 with the exception that the composition for adhesion was supplied as a coating pattern having a dotted shape (diameter:

50 μm; distance between dots: 200 μm) in production of the laminate for a secondary battery. Note that the adhesive material had a fine dotted form. In other words, a plurality of large dots that were each an assembly of a plurality of fine dots of the adhesive material were present on an affixing surface. When a cross-section of the adhesive material was observed using a laser microscope, the cross-section had a protruding/depressed shape. Evaluations were performed in the same way as in Example 1. The results are shown in Table 1.

Example 3

An adhesive material, a composition for adhesion, a negative electrode, a positive electrode, a separator, a laminate for a secondary battery, and a secondary battery were prepared or produced in the same way as in Example 1 with the exception that the production conditions in production of the laminate for a secondary battery were changed as shown in Table 1. Note that the adhesive material had a fine dotted form. In other words, a plurality of fine dots of the adhesive material were arranged in a diagonally striped pattern on an affixing surface. When a cross-section of the adhesive material was observed using a laser microscope, the cross-section had a protruding shape. Evaluations were performed in the same way as in Example 1. The results are shown in Table 1.

Example 4

An adhesive material, a composition for adhesion, a negative electrode, a positive electrode, a separator, a laminate for a secondary battery, and a secondary battery were prepared or produced in the same way as in Example 1 with the exception that a monophase structure particulate polymer having a glass-transition temperature of 15° C. was used as a first adhesive material, the striped shape (θ: 45°; P: 400 μm; W: 30 μm) and production conditions in production of the laminate for a secondary battery were changed as shown in Table 1, and, in production of the secondary battery, five cut laminates for a secondary battery were stacked and were pressed at a temperature of 40° C. and a pressure of 1 MPa for 5 seconds to obtain a stack. Note that the adhesive material had a fine dotted form. In other words, a plurality of fine dots of the adhesive material were arranged in a diagonally striped pattern on an affixing surface. When a cross-section of the adhesive material was observed using a laser microscope, the cross-section had a protruding/depressed shape. Evaluations were performed in the same way as in Example 1. The results are shown in Table 1.

Comparative Example 1

An adhesive material, a composition for adhesion, a negative electrode, a positive electrode, a separator, a laminate for a secondary battery, and a secondary battery were prepared or produced in the same way as in Example 1 with the exception that the laminate for a secondary battery was produced using, as a separator, a product obtained by applying the composition for adhesion onto one side (for separator 21) or both sides (for separator 31) of a separator (product name: Celgard 2500) made of polypropylene (PP) as a dotted coating pattern using a gravure roll and then hot-air drying the composition for adhesion at a temperature of 70° C. (drying time: 6 s), and using a production apparatus having the same configuration as the production apparatus illustrated in FIG. 1 with the exception that the adhesive material feeders 60A to 60D and heating rollers were not included. Note that the adhesive material had a fine dotted form. In other words, a plurality of large dots that were each an assembly of a plurality of fine dots of the adhesive material were present on an affixing surface. When a cross-section of the adhesive material was observed using a laser microscope, the cross-section had a protruding shape. Evaluations were performed in the same way as in Example 1. The results are shown in Table 1.

Note that blocking of a separator wound up as a roll occurred during production of the laminate for a secondary battery, and thus production was carried out while performing peeling of the separator.

TABLE 1

| | | | | | Example 1 | Example 2 | Example 3 | Example 4 | Comparative Example 1 |
|---|---|---|---|---|---|---|---|---|---|
| Composition for adhesion | Adhesive material | First adhesive material | Core-shell particles | Glass-transition temperature of core portion [° C.] | 108 | 108 | 108 | — | 108 |
| | | | | Glass-transition temperature of shell portion [° C.] | −17 | −17 | −17 | — | −17 |
| | | | | Diameter of core portion [%] | 50 | 50 | 50 | — | 50 |
| | | | | Volume-average particle diameter [μm] | 0.5 | 0.5 | 0.5 | — | 0.5 |
| | | | | D10/D50 [—] | 0.8 | 0.8 | 0.8 | — | 0.8 |
| | | | | D90/D50 [—] | 1.3 | 1.3 | 1.3 | — | 1.3 |
| | | | | Amount [parts by mass] | 100 | 100 | 100 | — | 100 |
| | | | Particulate polymer | Glass-transition temperature [° C.] | — | — | — | 15 | — |
| | | | | Volume-average particle diameter [μm] | — | — | — | 0.5 | — |
| | | | | D10/D50 [—] | — | — | — | 0.8 | — |
| | | | | D90/D50 [—] | — | — | — | 1.3 | — |
| | | | | Amount [parts by mass] | — | — | — | 100 | — |
| | | Second adhesive material | SBR | Glass-transition temperature [° C.] | 11 | 11 | 11 | 11 | 11 |
| | | | | Volume-average particle diameter [μm] | 0.18 | 0.18 | 0.18 | 0.18 | 0.18 |
| | | | | Amount [parts by mass] | 10 | 10 | 10 | 10 | 10 |

TABLE 1-continued

|  |  | Example 1 | Example 2 | Example 3 | Example 4 | Comparative Example 1 |
|---|---|---|---|---|---|---|
| | Solvent | Water | Water | Water | Water | Water |
| | Solid content concentration [mass %] | 10 | 10 | 10 | 10 | 10 |
| | Viscosity [mPa · s] | 5 | 5 | 5 | 5 | 5 |
| | Surface tension [mN/m] | 30 | 30 | 30 | 30 | 30 |
| | Amount of coarse particles [ppm] | 3 | 3 | 3 | 3 | 3 |
| Production conditions | Formation method | Inkjet | Inkjet | Inkjet | Inkjet | Gravure roll |
| | Coating pattern | Striped | Dotted | Striped | Striped | Dotted |
| | Gradation number | 5 | 5 | 5 | 2 | — |
| | Formed amount of adhesive material [g/m$^2$] | 0.5 | 0.5 | 0.5 | 0.2 | 0.5 |
| | Formation shape of adhesive material | Dotted | Dotted | Dotted | Dotted | Dotted |
| | Average thickness [μm] | 1 | 1 | 1 | 1 | 1 |
| | Maximum thickness [μm] | 3 | 3 | 2 | 3 | 1.3 |
| | Formation area (per location) [μm$^2$] | 5000 | 5000 | 5000 | 2000 | 50000 |
| | Cross-sectional shape of adhesive material | Protruding/depressed shape | Protruding/depressed shape | Protruding shape | Protruding/depressed shape | Protruding shape |
| | Drying temperature [° C.] | 70 | 70 | 25 | 70 | 70 |
| | Drying time [s] | 1 | 1 | 6 | 1 | 6 |
| | Affixing pressure [MPa] | 1 | 1 | 1 | 1 | 1 |
| | Affixing temperature [° C.] | 70 | 70 | 70 | 40 | 70 |
| Evaluation | Dry adhesive strength | A | A | B | A | C |
| | Electrolyte solution injectability | A | C | A | A | C |
| | Output characteristics | A | A | A | A | A |
| | Cycle characteristics | A | A | A | A | A |

It can be seen from Table 1 that a laminate for a secondary battery could be efficiently produced while also ensuring adhesive strength between an electrode and a separator in Examples 1 to 4. On the other hand, it can be seen from Table 1 that in Comparative Example 1, peeling of an adhesive material occurred due to blocking of a separator, adhesive strength between an electrode and a separator could not be sufficiently ensured, and a laminate for a secondary battery could not be efficiently produced.

INDUSTRIAL APPLICABILITY

According to the present disclosure, it is possible to efficiently produce a laminate for a secondary battery while also ensuring adhesive strength between an electrode and a separator.

REFERENCE SIGNS LIST 1 conveying roller
2 pressing roller
10 negative electrode roll
11 negative electrode
20 first separator roll
30 second separator roll
21, 31 separator
40 positive electrode stocker
41 positive electrode
50 cutting machine
60A, 60B, 60C, 60D adhesive material feeder
61 adhesive material
100 production apparatus
200 laminate for secondary battery

The invention claimed is:

1. A method of producing a laminate for a secondary battery including an electrode and a separator that are affixed to each other, comprising:

a step (A) of forming an adhesive material on an affixing surface of at least one of the electrode and the separator;

a step (B) of, after the step (A), conveying the electrode and the separator to an affixing start position without bringing another member into contact with the affixing surface on which the adhesive material has been formed; and a step (C) of, after the step (B), affixing the electrode and the separator to each other via the affixing surface, wherein a formed amount of the adhesive material in the step (A) is not less than 0.1 g/m$^2$ and not more than 100 g/m$^2$, the adhesive material is formed of a polymer, the formation of the adhesive material, in the step (A), is performed by an inkjet method using a composition for adhesion containing the adhesive material and a solvent, the composition for adhesion has surface tension of 20 mN/m or more, and 65 mN/m or less, and a cross-sectional shape of the adhesive material is a protruding-depressed shape or a depressed shape.

2. The method of producing the laminate for the secondary battery according to claim 1, wherein the polymer includes a low-Tg polymer having a glass-transition temperature of 25° C. or lower.

3. The method of producing the laminate for the secondary battery according to claim 1, wherein
an amount of coarse particles having a diameter of 10 μm or more contained in the composition for adhesion is 100 ppm or less.

4. The method of producing the laminate for the secondary battery according to claim 1, wherein
the adhesive material is formed at one or more locations on the affixing surface in the step (A), and
the adhesive material has a formation area of not less than 25 μm$^2$ and not more than 250,000 μm$^2$ per location.

* * * * *